United States Patent
Zuckerman

(10) Patent No.: US 10,822,563 B2
(45) Date of Patent: Nov. 3, 2020

(54) CYLINDER RESIDENT HYDROLYSIS OF OLEFINS TO PETROLEUM GASES

(71) Applicant: Mathew M Zuckerman, Carbondale, CO (US)

(72) Inventor: Mathew M Zuckerman, Carbondale, CO (US)

(*) Notice: Subject to any disclaimer, the term of this patent is extended or adjusted under 35 U.S.C. 154(b) by 0 days.

(21) Appl. No.: 16/192,587

(22) Filed: Nov. 15, 2018

(65) Prior Publication Data

US 2019/0144771 A1    May 16, 2019

Related U.S. Application Data

(60) Provisional application No. 62/586,499, filed on Nov. 15, 2017.

(51) Int. Cl.

| | | |
|---|---|---|
| *C10L 1/23* | (2006.01) | |
| *C10L 1/10* | (2006.01) | |
| *C10L 10/10* | (2006.01) | |
| *C10L 1/30* | (2006.01) | |
| *B01J 31/28* | (2006.01) | |
| *C10L 1/16* | (2006.01) | |
| *C10L 1/12* | (2006.01) | |

(52) U.S. Cl.
CPC .............. *C10L 1/231* (2013.01); *C10L 1/10* (2013.01); *B01J 31/28* (2013.01); *B01J 2531/824* (2013.01); *B01J 2531/828* (2013.01); *C10L 1/103* (2013.01); *C10L 1/1216* (2013.01); *C10L 1/1608* (2013.01); *C10L 1/1616* (2013.01); *C10L 1/305* (2013.01); *C10L 10/10* (2013.01); *C10L 2270/023* (2013.01); *C10L 2290/04* (2013.01)

(58) Field of Classification Search
CPC ................................. C10L 1/231; C10L 10/10
USPC ............................................. 44/324, 325, 326
See application file for complete search history.

(56) References Cited

U.S. PATENT DOCUMENTS

| | | | | | |
|---|---|---|---|---|---|
| 4,891,050 | A | * | 1/1990 | Bowers | C07F 15/0086 44/333 |
| 5,034,020 | A | * | 7/1991 | Epperly | B01D 53/944 44/358 |
| 5,749,928 | A | * | 5/1998 | Epperly | B01D 53/944 44/352 |
| 5,782,937 | A | * | 7/1998 | Colucci | C10L 1/143 44/324 |
| 2009/0320354 | A1 | * | 12/2009 | Kormann | C07C 29/175 44/325 |

(Continued)

*Primary Examiner* — Ellen M McAvoy

(57) ABSTRACT

An additive has been prepared for blending with gasoline that facilitates a cylinder resident reaction, in high compression internal combustion engines (ICEs), to produce an increase in engine's mechanical energy output. A method of increasing mechanical efficiency of an internal combustion engine (ICE) comprising blending an amount of additive with gasoline to perform hydrolysis of olefin hydrocarbons, represented by octene (C8) into petroleum gas hydrocarbons, represented by butane (C4), wherein the additive facilitates cylinder-resident reaction, aided by a low concentration of organometallic catalyst, to utilize the elements of the water combustion product, to hydrolyze olefin hydrocarbons such as octene, resident in the gasoline, into petroleum gas hydrocarbons such as butane, and to increase the ICE's efficiency of utilization of the energy of the fuel.

13 Claims, 8 Drawing Sheets

Hydrolysis:

$$2\ C_8H_{16} + 4\ H_2O \longrightarrow 4\ C_4H_{10} + 2\ O_2$$

Octene    Water         Butane    Oxygen

Heat of Combustion = 2 Moles of Octene x 44,427 kJ/Mole. = 88,854 kJ
Air to Fuel Ratio = 15:1

Combustion $$4\ C_4H_{10} + 26\ O_2 \longrightarrow 16\ CO_2 + 20\ H_2O$$

Butane   Oxygen     C. Dioxide   Water

Heat of Combustion = 4 Moles of Butane x 45,752 kJ/Mole. = 183,008 kJ
Air to Fuel Ratio = 14.2:1

Note: A subset of combustion that involves a supersonic exothermic front accelerating through the medium, that drives a shock front progressively directly in front of it.

(56) References Cited

U.S. PATENT DOCUMENTS

| | | | |
|---|---|---|---|
| 2010/0223841 A1* | 9/2010 | Jordan | C10L 1/143 44/326 |
| 2010/0293841 A1* | 11/2010 | Zuckerman | C10L 1/14 44/325 |
| 2011/0185627 A1* | 8/2011 | Zuckerman | C10L 1/02 44/414 |
| 2013/0160354 A1* | 6/2013 | Bansie | C10L 10/12 44/324 |
| 2013/0180164 A1* | 7/2013 | Wolf | C10L 1/023 44/451 |
| 2014/0150333 A1* | 6/2014 | Brewer | C10L 1/1811 44/326 |
| 2015/0315503 A1* | 11/2015 | Paggi | C10L 1/1608 44/324 |
| 2016/0075967 A1* | 3/2016 | Gao | C10M 111/04 508/506 |
| 2018/0370883 A1* | 12/2018 | Haritonov | C07C 29/136 |
| 2019/0249097 A1* | 8/2019 | Cracknell | C10L 1/06 |

* cited by examiner

Hydrolysis:

$$2\, C_8H_{16} + 4\, H_2O \longrightarrow 4\, C_4H_{10} + 2\, O_2$$

Octene    Water           Butane    Oxygen

Heat of Combustion = 2 Moles of Octene x 44,427 kJ/Mole. = 88,854 kJ
Air to Fuel Ratio = 15:1

Combustion

$$4\, C_4H_{10} + 26\, O_2 \longrightarrow 16\, CO_2 + 20\, H_2O$$

Butane    Oxygen       C. Dioxide    Water

Heat of Combustion = 4 Moles of Butane x 45,752 kJ/Mole. = 183,008 kJ
Air to Fuel Ratio = 14.2:1

Note: A subset of combustion that involves a supersonic exothermic front accelerating through the medium, that drives a shock front progressively directly in front of it.

FIG. 1

The Preferred Embodiments of the Leaded and Un-leaded Additive

| CAS | Chemical | Leaded Additive Volume % | Unleaded Additive Volume % |
|---|---|---|---|
| 67-56-1 | Methanol | 40.59 | 41.78 |
| 75-52-5 | Nitro Methane | 21.14 | 27.86 |
| 27247-96-7 | 2 Ethylhexyl Nitrate | 16.64 | 16.64 |
| 67-64-1 | Actone | 10.24 | 10.24 |
| | Sub Total | 88.61 | 88.51 |
| Additives | DCI-11 Plus | 0.29 | 0.29 |
| | DMA-641 | 0.57 | 0.57 |
| | Organoplatinum | 0 | 0.10 |
| | Sunoco MaxNos 116 | 10.53 | 0 |
| | VP Tech MS109 | 0 | 10.53 |
| | Subtotal | 11.4 | 11.5 |
| | Total | 100.0 | 100.0 |

FIG. 2

Maximum Allowable Lead Content in Gasoline is 50 mg/Gallon as Pb

| Additive Dose Fl. Oz. / 20 Gallons | X Parts of Gasoline to One Part Additive | Lead as Pb mg/Gallon |
|---|---|---|
| 0.25 | 10,240 | 0.03 |
| 0.5 | 5,120 | 0.06 |
| 0.64 | 4,000 | 0.08 |
| 1.0 | 2,560 | 0.13 |
| 1.5 | 1,707 | 0.19 |
| 2.5 | 1,024 | 0.32 |
| 3.0 | 853 | 0.38 |
| 3.5 | 731 | 0.45 |
| 4.5 | 569 | 0.57 |
| 5.5 | 465 | 0.70 |
| 6.5 | 394 | 0.83 |
| 7.5 | 341 | 0.96 |
| 8.5 | 301 | 1.08 |
| 9.5 | 269 | 1.21 |
| 10.0 | 256 | 1.28 |
| 12.0 | 213 | 1.53 |
| 14.0 | 183 | 1.79 |
| 16.0 | 160 | 2.04 |
| 18.0 | 142 | 2.30 |
| 20.0 | 128 | 2.55 |
| 22.0 | 116 | 2.81 |
| 24.0 | 107 | 3.06 |
| 26.0 | 98 | 3.32 |
| 28.0 | 91 | 3.57 |
| 30.0 | 85 | 3.83 |
| 32.0 | 80 | 4.08 |
| 34.0 | 75 | 4.34 |
| 36.0 | 71 | 4.59 |
| 38.0 | 67 | 4.85 |
| 40.0 | 64 | 5.10 |
| 42.0 | 61 | 5.36 |
| 44.0 | 58 | 5.61 |
| 46.0 | 56 | 5.87 |
| 48.0 | 53 | 6.12 |
| 50.0 | 51 | 6.38 |

FIG. 3

Racing Fuel

| | |
|---|---|
| Cost of Existing Racing Fuel, $/Gal. | 6.11 |
| Regular Octane | 88 |
| Cost of Regular Fuel, $/Gal. | 2.15 |
| Existing Racing Fuel Octane | 116 |
| New Fuel Additive/Total by Volume, % | 0.06 |
| 1.5 Fluid Ounces per 20 Gallons | |
| New Fuel Octane | 121 |

Why Buy Additive? New Fuel has higher Octane than Existing Fuel 5

Equation Octane Number $_{New\ Fuel}$ = 0.9994 × Octane Number $_{Regular}$ × 0.0006 Octane $_{Additive}$

What is the Octane of the Additive?

| | |
|---|---|
| New Fuel Octane | 121 |
| Octane of Regular | 88 |
| Fraction by Volume of Regular | 0.9994 |
| Octane Contributed by Regular | 87.9472 |
| Fraction by volume of Additive | 0.0006 |
| Octane of Additive | 55,088 |

What is the value of the Additive, $/Gal. Based on Equivalent to Existing Racing Fuel

| | |
|---|---|
| Cost of Regular Fuel, $/Gal. | 2.15 |
| Fraction by Volume of Regular | 0.9994 |
| Cost of Fraction of Regular, $/Gal. | 2.15 |
| Cost of Existing Racing Fuel, $/Gal. | 6.11 |
| Fraction by volume of Additive | 0.0006 |
| Cost of Fraction of Additive, $/Gal. | 3.96 |
| What is the Value of the Additive, $/Gal. | 6,602.15 |

FIG. 6

Making Premium Grade Gasoline by Adding Detonator ™ to Regular Grade Gasoline.

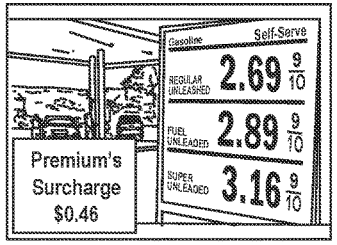

| Premium: 20 Gallons @ $3.17 | = | $63.40 |
| Regular: 20 Gallons @ $2.70 | = | $54.00 |
| Savings at the Pump | = | $ 9.40 |
| Detonator ™ (20 ml, 0.67 oz.) | = | $ 2.50 |
| Savings for 20 Gallons purchase | = | $ 6.90 |

Making Racing Fuel by Adding Detonator Racing™ to Regular Grade Gasoline

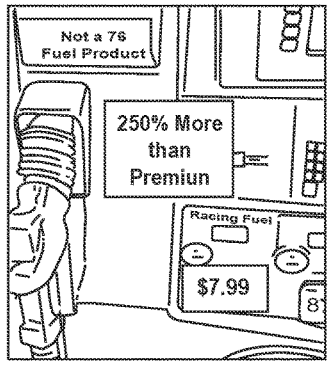

| Premium: 20 Gallons @ $7.99 | = | $159.80 |
| Regular: 20 Gallons @ $2.70 | = | $ 54.00 |
| Savings at the Pump | = | $105.80 |
| Detonator Racing™ (20 ml, 1.5 oz.) | = | $ 19.95 |
| Savings for 20 Gallons Purchase | = | $ 85.85 |

Raising the Energy of E85 to equal that of Regular Grade gasoline by Adding Detonator ™
Thirty gallons of E85 has the equivalent energy of 20 gallons of Regular Grade gasoline.

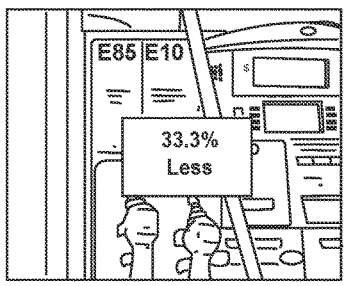

| E85: 30 Gallons @ $2.11 | = | $63.30 |
| E85: 20 Gallons @ $2.11 | = | $42.20 |
| Savings at the Pump | = | $21.20 |
| Detonator Alcohol™ (20 ml, 1.5 oz.) | = | $ 9.95 |
| Savings for 20 Gallons Purchase | = | $ 11.15 |

FIG. 8

CYLINDER RESIDENT HYDROLYSIS OF OLEFINS TO PETROLEUM GASES

The current application claims a priority to the U.S. Provisional Patent application Ser. No. 62/586,499 filed on Nov. 15, 2017.

FIELD OF THE INVENTION

The present invention relates generally to the manufacture of an additive for blending with gasoline that facilitates a cylinder resident reaction, in high compression internal combustion engines (ICEs), to produce an increase in engine's mechanical energy output.

The present invention relates specifically to an additive that facilitates cylinder-resident reaction, aided by a low concentration of organometallic catalyst, to utilize the elements of the water combustion product, to hydrolyze olefin hydrocarbons such as octene, resident in the gasoline, into petroleum gas hydrocarbons such as butane, and to increase the ICE's efficiency of utilization of the energy of the fuel

BACKGROUND OF THE INVENTION

Crude oil contains 500 hydrocarbons that are refined into useful products. A characteristic of these different hydrocarbons is that as the number of carbons increases, the boiling point of these materials increases, so that hydrocarbon can be separated into fractions by the refinery processes called distillation. Distillation is a process of heating crude oil and fractionating into temperature ranges that correspond to the boiling points of the hydrocarbons. The fractions of interest in the present invention are those hydrocarbons with the small number of carbons in the chains that are the light fractions, whose boiling points are at low temperatures.

Catalysts

Lead is the catalytic metal of choice for chemical reactions. Tetraethyl lead has been the gasoline soluble catalyst of choice to catalyze reactions that increase the octane number (ON) of gasoline. However, adding lead to gasoline has fallen in disfavor since the 1970's in the US. This leads to the possibility of seeing catalytic materials from the fuel-soluble platinum group used as auto catalysts when a lead substitute is required. The fuel-soluble platinum group contains six (6) metals and further subdivided into the iridium-group containing three (3) of the six (6) metals. The metals of interest are the three (3) metals not contained in the iridium-group. These metals and their annual use in 1996 with statics for consumption, in troy ounces, as auto catalysts are: palladium (Pd), 4,470, platinum (Pt), 1,830 and rhodium (Rh) 490. The form for addition of the two (2) most commonly used metals for fuel is organopalladium and organoplatinum. Organopalladium is preferred to organoplatinum because the former is more stable than the latter, therefore organopalladium requires a smaller dosage to be as effective as organoplatinum.

Crude Oil Fractions

The following are the lighter fractions of hydrocarbons in the distillation process.

Petroleum Gas: This fraction is used for cooking, heating and plastics manufacture. This fraction contains alkanes, straight chains of carbons connected with single, saturated bonds that contain one (1) to four (4) carbons in the chain. The boiling point for this fraction is less than 104 degrees F. (40 degrees C.). The hydrocarbons named in order of increasing number of carbons in the chain are: methane, ethane, propane and butane. Butane, with an extremely large Reid Vapor Pressure (RVP) value of 52 psi, is a gas at ambient conditions of pressure and temperature. However, butane is soluble in gasoline allowing it to make a fractional contribution to the combined RVP of the blended gasoline based on its content in percent by volume.

Naphtha: This is used, with further processing, to increase the octane number (ON) of gasolines, to prevent the energy robbing and mechanical disruptive knocking in internal combustion engines (ICEs). This fraction contains carbons in ring structures, that have distinct odors and are members of a group of hydrocarbons called aromatics or cyclic compounds. The boiling point range for this fraction is 140 degrees F. (60 degrees C.) to 212 degrees F. (100 degrees C.).

Gasoline: This fraction is called "straight run" gasoline. Historically, this gasoline was the first gasoline used in ICE. Today's gasolines are called "reformulated gasoline" with this "straight run" gasoline as only one of the components of the fuel. However, this fraction is still sold as 100% "straight run" gasoline with dye added as "yellow" gasoline that is mainly for use on farm equipment where its low ON, in the mid-50's, is augmented by tetraethyl lead to still have a low ON, in the mid-60s. This fraction contains: alkane, straight chains of carbons connected with single, saturated, bonds that contain five (5) to twelve (12) carbons in the chain; olefins (alkenes), straight chains of carbons connected with at least one double, un-saturated, bond that contain five (5) to twelve (12) carbons in the chain; and cycloalkanes that are alkanes with cyclic, naphtha like, hydrocarbons attached. The boiling point range for this fraction is 104 degrees F. (40 degrees C.) to 401 degrees F. (205 degrees C.). The bromine number (ASTM D 86) is a measure of the unsaturated material consisting of olefins (alkenes) in the gasoline. "Straight run gasoline" has a bromine number of 195 making olefins the major hydrocarbon fraction with 81% by volume based on the experimentally determination that the olefin to bromine number ratio is 1:2.4. For distillation fractions with higher than 212 degrees F. (100 degrees C.) boiling point, the bromine number is 10 or less. This low bromine number indicates that only minimal quantities of olefins are present in distillation fractions with associated boiling points higher than 212 degrees F. (100 degrees C.).

"Straight run" gasoline is a fractional component found in all gasolines. Naphtha is blended, after further process, to be blended with "straight run gasoline" to increase the octane number (ON) of all "reformulated gasolines". A greater quantity of the naphtha distillation fraction blended in gasoline results in the progression of the grade of gasolines from regular grade gasoline (average ON of 87) to mid-range gasoline (average ON of 89.5) to premium grade gasoline (average ON of 92).

The two isomers of butane (C4) are present in all grades of gasolines. Butane's primary purpose is to increase the Reed Vapor Pressure (RVP) of the gasoline so that the engine will have sufficient volatility to "cold start". An additional benefit of blending butane, with ON of 102, in "reformatted gasoline" is to increase the ON. The RVP (ASTM D 323), a measure of the volatility of gasoline, is the absolute vapor pressure exerted by the gasoline at 37.8 degrees C. (100 degrees F.). Butane has an extremely high RVP of 52. The volumetric concentration of butane in gasoline is limited to 2% in summer and to 10% winter. If butane is present in greater than these percentages of the combined RVP of the gasoline, "vapor lock" in the fuel lines may occur leading to the ICE being stalling. In gasoline blended for summer use, butane, present at a volumetric concentration of 2%, contributes 1 psi to the total RVP of the fuel that must fall in a specified range of 7.8 to 9. In gasoline blended for winter use, butane, present at a volumetric concentration of 10%, contributes 5.2 psi to the total RVP of the fuel that must fall in a specified range of 7.8 to 9.

Octane number (ON) enhancement of gasoline started with the move in the 70's away from tetraethyl lead to MTBE, a chemical that has the added benefit of providing oxygen to reduce exhaust emissions. MTBE after first being Government mandate, by the newly formed Environmental Protection Agency, was later banned, because of its side effect of polluting ground waters. Ethanol, as a replacement for MTBE, was Government mandated to increase ON and oxygen to reduce exhaust emissions, has seen a yearly increase in concentration to a specified maximum concentration of 10%, by volume to produce "unleaded gasolines". "Unleaded gasoline" contains a maximum lead concentration of 0.05 grams per gallon (17 ppm).

Octane Number (or (Octane Rating)

Octane rating is measured relative to a mixture of an isomer of octane (C-8), 2,2,4-trimethylpentane and n-Heptane. There are two octane ratings conventions. One is the motor octane number (MON) and the other is the research octane number (RON). In the U.S. the octane number (ON) is average of MON and RON. Outside the US, most countries use the RON which is the larger number. An ICE needs to be fueled with gasoline that has sufficient ON to avoid a deleterious condition called "knocking". Once an engine is fueled with gasoline having a sufficient ON to avoid "knocking", the use of gasoline with higher ON will have no affect and will not, as commonly believed, result in higher mileage.

Engine "knocking" occurs when on uncontrolled detonation of the gasoline, by autoignition under the conditions of pressure and temperature in the cylinder, before the controlled detonated by a spark can occur. This causes a rapid rise in pressure that produces a knocking sound. An engine's compression ratio is calculated as the cylinder volume when the piston is at the bottom position divided by the cylinder volume when the piston is at the top position. Larger and heavier cars and light trucks are equipped with high horsepower ICEs that operate at high compression ratios, equal or exceed 10:1, that support increased engine efficiencies of utilizing the energy in the gasoline. ICE with high compression ratios requires premium gasoline (average ON of 92) or mid-range gasolines (average ON of 89.5) to avoid uncontrolled preignition or "knocking".

Air to Fuel Ratio

Stoichiometric combustion of a hydrocarbon is when the exact amount of oxygen, on a mole to mole basis, is provided to produce the combustion products of water and carbon dioxide. The stoichiometric air to fuel ratio for combustion of gasoline is 14.7 pounds of air per pound of fuel and for ethanol is 9.0 pounds of air per pound of fuel. This difference of 5.7 pounds of air to burn a pound of fuel is explained by two factors. First the gasoline contains hydrocarbons with four (4) to twelve (12) carbons in the chain whereas, ethanol contains only two (2) carbons in the chain and each of these carbons requires one oxygen to complete combustion. Second, ethanol contains one of the two (2) oxygens required to complete combustion of one of its carbons as part of the molecule.

The following is a calculation of the stoichiometric air to fuel ratio for combustion of octane, butane and octene with the atomic weights of carbon (C), oxygen (O), diatomic oxygen ($O_2$), and hydrogen (H) of 12.01, 16, 32 and 1.008, respectively.

The combustion reaction for octane with atomic weight of 114 is:

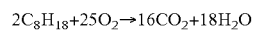
$$2C_8H_{18}+25O_2 \rightarrow 16CO_2+18H_2O$$

The oxygen to fuel ratio is 25×32/2×114=3.5 kg of oxygen per kg of octane
Since the mole percent of Oxygen in air is 23.2.
Then, 3.5×100/23.2=15 kg of air per kg of octane
The combustion reaction for butane with atomic weight of 58 is:

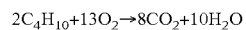
$$2C_4H_{10}+13O_2 \rightarrow 8CO_2+10H_2O$$

The oxygen to fuel ratio is 13×32/2×58=3.5 kg of oxygen per kg of butane
Since the mole percent of oxygen in air is 23.2.
Then, 3.5×100/23.2=15 kg of air per kg of butane
The combustion reaction for octene with atomic weight of 112 is:

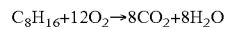
$$C_8H_{16}+12O_2 \rightarrow 8CO_2+8H_2O$$

The oxygen to fuel ratio is 12×32/112=3.4 kg of oxygen per kg of octene
Since the mole percent of oxygen in air is 23.2.
Then, 3.4×100/23.2=14.8 kg of air per kg of octene
The same quantity of air is required for combustion of octene or butane. The energy of combustion from butane (1.96×2,874=5,633 kJ/mol.) is higher than the energy of combustion for octane (5,460 kJ/mol.). Therefore, when hydrolysis of one (1) mole of octene occurs to produce two (2) moles of butane prior to combustion than the net energy produced from combustion is almost doubled. An added benefit of butane, with a shorter carbon chain length, is that the ON increase for the ON of all hydrocarbons increases as the carbon chain length of the hydrocarbon decreases. The ON of butane (Isobutane) is 102 which is higher value than octane (isooctane) that is 100. The ON of a gasoline increases as alkenes, represented by octane (C8) is decreased in favor of the presence of the short carbon chain hydrocarbon petroleum gas, represented by butane (C4).

Spark Ignition

Spark ignition engines are designed to burn gasoline in a controlled process called deflagration or combustion. Deflagration is initiated by the production of an electric spark across an air gap that is present on top of the cylinder (spark plug). The time of the occurrence of the spark is referred to relative to the top of its stroke position of the piston: where maximum compression occurs. If the spark is timed to occur at the exact time that the piston is in the top of its stroke position the timing is referred to a "top center" and a value for the ignition timing of zero degrees is assigned. If the spark is timed to occur at the time AFTER the piston is in the top of its stroke position the timing is referred to a "retarded ignition" and a value for the timing of post-ignition degrees is assigned as the ignition timing. If the spark is timed to occur at the time before the piston is in the top position the timing is referred to a "pre-ignition" and a value for the timing of pre-ignition degrees is assigned as the ignition timing.

FIG. 7 shows the positive effect of pre-ignition timing advance on an engine's efficiency. This increase in ICE's efficiency is due to increased pressure in the compression stroke that results in an increase in higher net-work output. If ignition is too advanced, too much of the gas will burn while the piston is rising and pre-ignition or "knocking" occurs that results in a decrease in the ability to expend the work that must be done to compress the gas. These competing effects create a point at which optimum performance is achieved and results in the occurrence of a point of maximization the ICE's net-work output at an ignition advance position that is specific to the fuel's ON and compression ratio.

In a world concerned about rising levels of atmospheric carbon dioxide, there is a continuing need to improve the efficiency of ICE so that a smaller carbon footprint will be left after each trip of a vehicle by increasing the miles traveled per gallon of gasoline consumed.

OBJECTIVES OF THE INVENTION

The primary object of the present invention is to manufacture an additive for blending with gasoline that facilitates a cylinder resident series of reaction, in a high compression internal combustion engine (ICE) wherein a detonation occurs, at the pressure and temperature conditions present in the cylinder, causing a chain of reactions that utilize the elemental components of water, present as products of combustion, to produce hydrolysis of olefin hydrocarbons, represented by octene (C8) into petroleum gas hydrocarbons, represented by butane (C4), that increase the engine's mechanical efficiency through the mechanisms of: adding butane's RVP to increase the pressure in the compression stroke, above the ICE's own compressions of 10:1 or higher; Butane with an octane rating (ON) of 102 to the gasoline that enters the cylinder; advancing the spark ignition; reducing the air to fuel ratio; and increasing the energy density of the gasoline by the hydrolysis reaction that increase the petroleum gas, butane, component's concentration at the expense of decrease the olefin component's concentration.

Another object of the present invention is to manufacture an additive for blending with "straight run" or regular grade gasoline that provides an equivalent octane number (ON) to premium grade gasoline, in a high compression ICE by replacing the high ON naphtha, normally added to regular gasoline to increase the ON, by a cylinder resident hydrolysis reaction in which olefins, represented by octene with eight carbons in the chain (C8) are morphed into petroleum gas, represented by butane with four carbons in the chain (C4).

A further object of the present invention is to manufacture an additive for blending with gasoline that raises the lead concentration in the fuel, without exceeding fuel standards level of 50 ppm, that catalyzes the cylinder resident hydrolysis reaction in which olefins, represented by octene with eight carbons in the chain (C8) are morphed into petroleum gas, represented by butane with four carbons in the chain (C4).

A still further object of the present invention is to utilize an organopalladium or organoplatinum metal catalyst to produce a lead-free formulation that achieves an equivalent performance.

A further object of the present invention is to manufacture an additive for blending with fuel that raises the level of vaporization, RVP, in the ICE's cylinder to improve "cold start", under all seasonal conditions, while avoiding the "vapor lock" in the fuel lines that would occur if the same concentration of petroleum gas hydrocarbons were blended in the cylinder with feed gasoline to achieve an equivalent level of vaporization.

Another object of the present invention is to manufacture an additive for blending with gasoline that facilitates a cylinder resident reaction to utilizes the elemental oxygen in the water combustion product from a high compression ICE to reduce the air to fuel ratio allowing the engine to run leaner so as to produce an increase in the engine's net-work output or mechanical efficiency.

SUMMARY OF THE INVENTION

The present invention employs a novel and no-obvious teaching of the manufacture of an additive, for blending with gasoline, to fuel a high compression internal combustion engine (ICE), that facilitates a cylinder resident series of reaction wherein a detonation occurs, at the pressure and temperature conditions present in the cylinder, causing a chain of reactions that utilize the elemental components of water, present as products of combustion, to produce hydrolysis of olefin hydrocarbons, represented by octene (C8) into petroleum gas hydrocarbons, represented by butane (C4), that increase the engine's mechanical efficiency through the mechanisms of: increasing the pressure in the compression stroke, above the engine's 10:1 or higher; contributing components with an octane rating (ON) of 102 to the gasoline that enters the cylinder; advancing the spark ignition; reducing the air to fuel ratio; and increasing the energy density of the gasoline by hydrolysis reaction that increase the petroleum gas component's concentration at the expense of decrease the olefin component's concentration.

BRIEF DESCRIPTION OF THE DRAWINGS

The patent or application file contains at least one drawing executed in black and white. Copies of this patent or patent application publication with black and white drawing(s) will be provided by the office upon request and payment of the necessary fee.

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be limiting of its scope.

Figure 4:
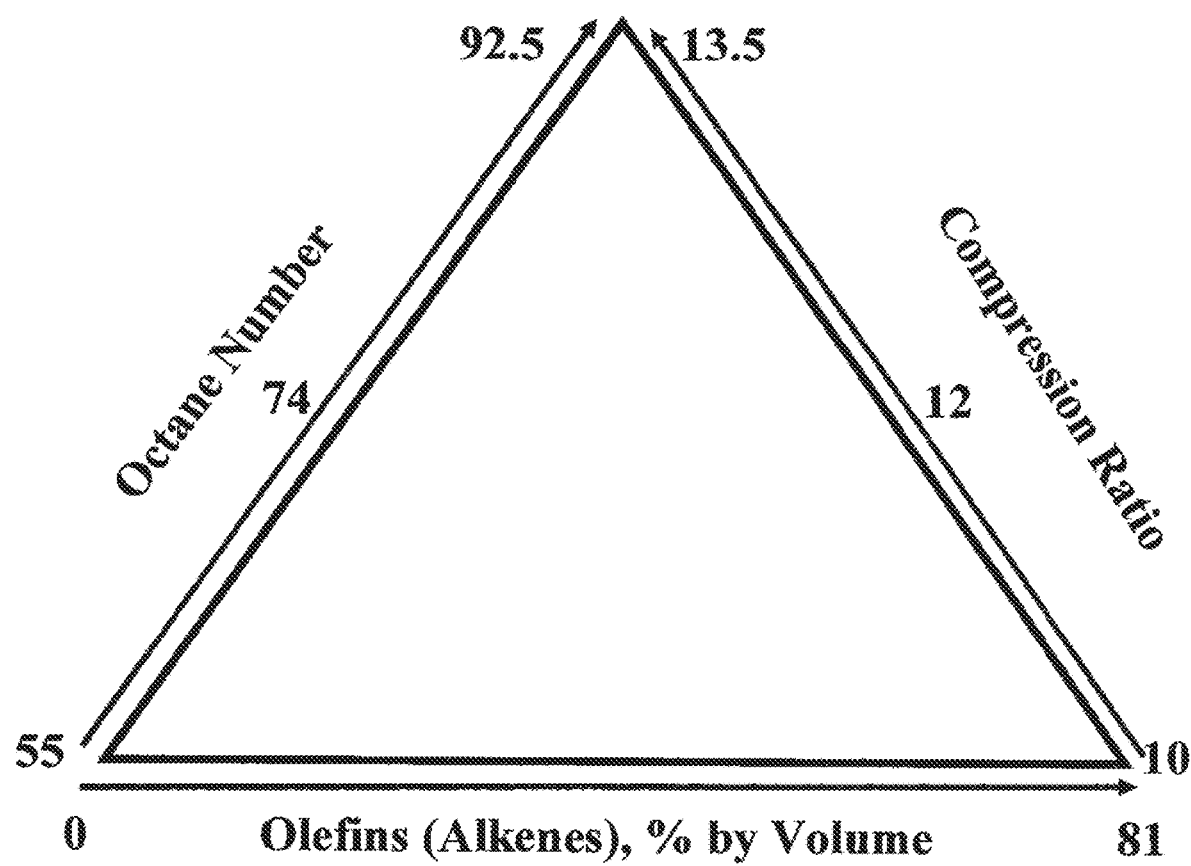
Figure 5:
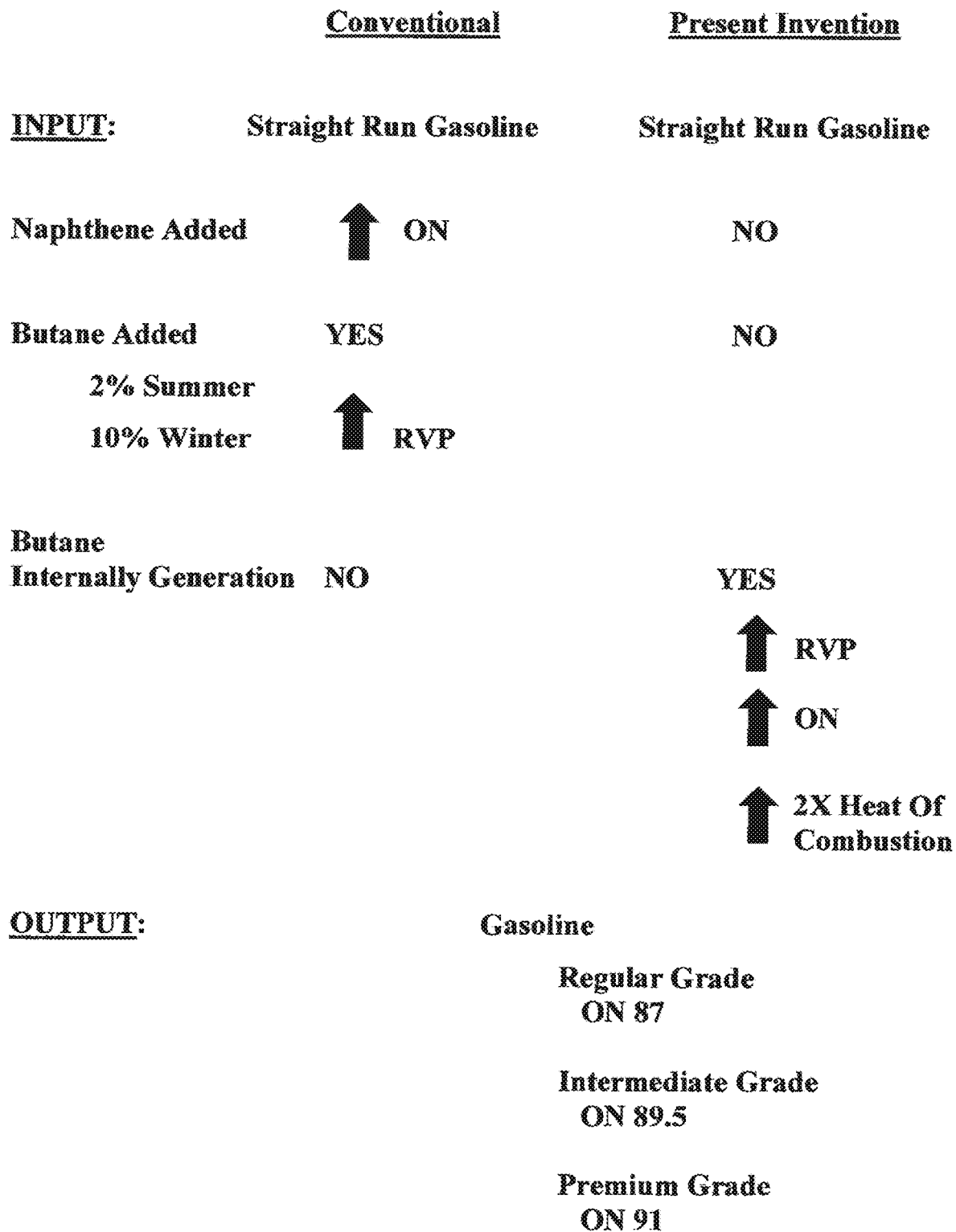
Figure 7:
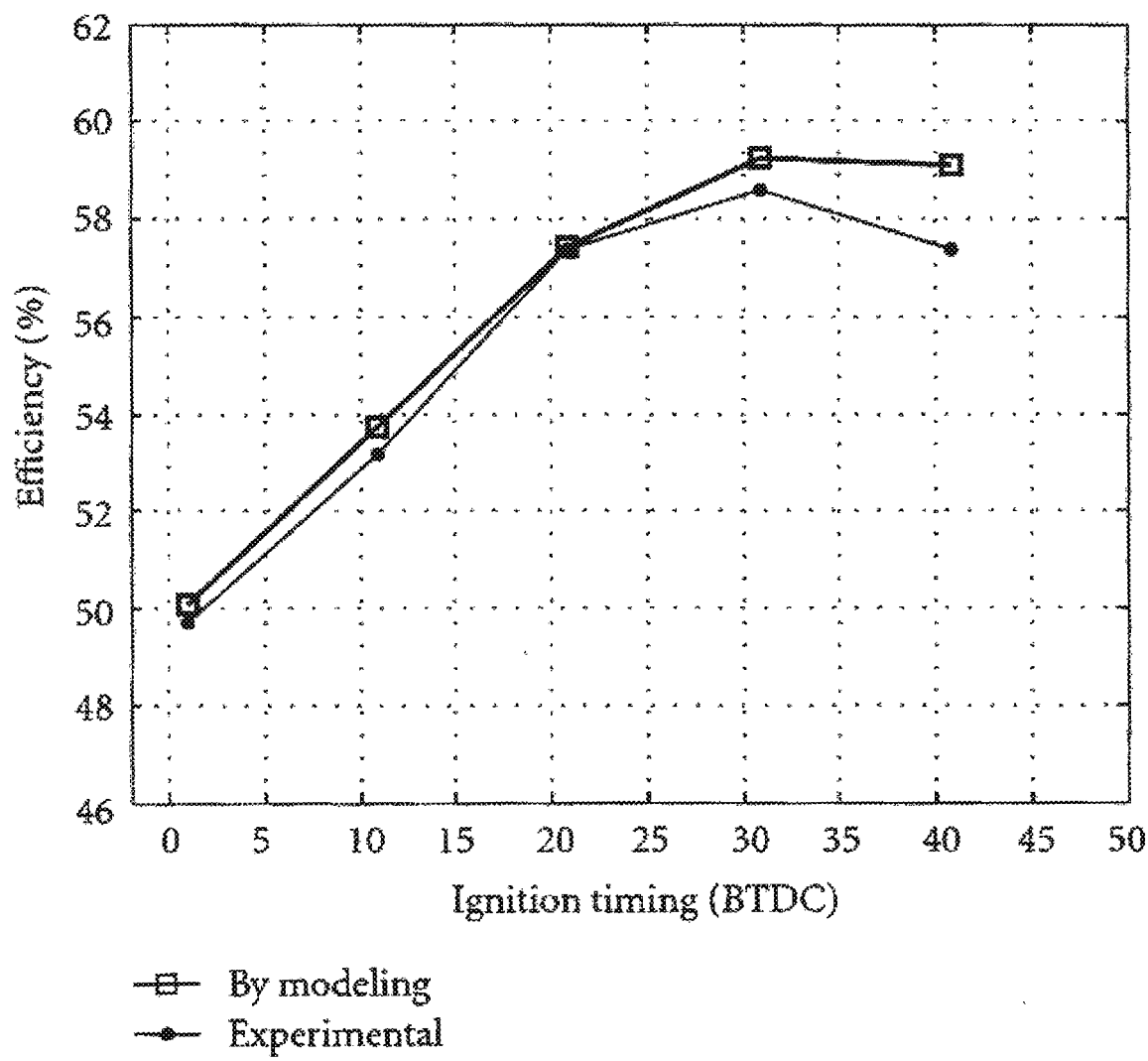

The invention will be described and explained with additional specificity and detail through use of accompanying drawings in which:

FIG. 1 shows the process of hydrolysis of olefin hydrocarbons and combustion of petroleum gas hydrocarbons in the ICEs;

FIG. 2 shows a complete formulation for a preferred embodiment of the leaded and unleaded additive;

FIG. 3 contains the conversion of additive in fluid ounces into relative dilution and lead concentration;

FIG. 4 presents the factors, that when taken together, combine to affect the efficiency of an ICE;

FIG. 5 is a comparison of the chemical additions that increase the ON and the RVP in conventional gasoline blending to the present invention's cylinder resident chemical hydrolysis that accomplish the requisite increase in ON and the RVP as well as an increase in the gasoline's heat of combustion to produce a premium fuel;

FIG. 6 shows the result and calculations for a racing fuel treated with 1.5 fluid ounces, with the Additive formulation in FIG. 2, in twenty (20) gallons of fuel;

FIG. 7 shows the relationship between the ICE's efficiency and the ignition timing advance as an integrating parameter of ON, and compression ratio; and FIG. 8 shows how three examples of how the additive can be used to save consumers money.

DETAILED DESCRIPTION OF THE INVENTION

All illustrations of the drawings are for the purpose of describing selected versions of the present invention and are not intended to limit the scope of the present invention.

When the combustion energy, in kJ per unit of molecular weight, of Olefins, represented by octene (C8), is compared to alkanes, represented by butane (C4), undergoes combustion that releases 789 kJ/unit of molecular weight that is dwarfed by the 400 kJ/unit of molecular weight of Octane (? Octene). Butane with a low boiling point, 20.66 degrees F. (−6.3 degrees C.) is more appropriately to be blended with propane (C3) and used as liquified petroleum gas (LPG) fuel and not used to fuel for ICEs. However, butane gas is soluble in liquid gasoline and is a component found in all grades of the "reformatted gasolines" available in the US's 150,000 stations where gasoline is sold. The use of butane has the benefits of being: inexpensive; available in excess quantities at refineries; 1.98 times the energy density of octane; 102 ON vs. 100 ON for octane; a RVP of 52 making it the "component of choice" for use to add the requisite volatility for "cold start" of ICEs. However, butane's concentration in "reformulated gasoline" is limited to 2% by volume in summer blends and 10% in winter blends so as not to exceed a maximum standard for RVP of 9 psi and avoid the unwanted occurrence of "vapor lock" in the gasoline feed system to the ICE.

In the present invention, the possibility of excess butane producing "vapor lock" is eliminated by producing butane in a cylinder resident reaction only after the gasoline has passed through the feed system. The cylinder resident reaction that produces butane is represented by the hydrolysis of the olefin, represented by the octene (C8), in FIG. 1. The concentration of olefins, alkenes, are present in crude oil and its distillation fraction called "straight run" gasoline. Olefins are called un-saturated for this class of hydrocarbons contains at least one double bond in its carbon chain. A gasoline's concentration of alkenes, in percent by volume, is determined by the bromine number (ASTM D 1159) divided by the number 2.4. The alkene concentration is 81% in "straight run" gasoline that is produced by distillation of crude oil in boiling point range of 104 degrees F. (40 degrees C.) to 401 degrees F. (205 degrees C.). Upon the occurrence of the increase in the ICE's efficiency is associated with the combustion of the lower molecular weight, butane that contains almost double the average energy density (AED) of Octene. The 2-ethylhexyl nitrate (EHN) present in the leaded and unleaded additive in the present invention detonates under the conditions that are resident in the cylinder, releasing 10 times the per unit of weight of this chemical as compared to combustion of the chemical. Therefore, as shown in FIG. 2, the small quantity of EHN present, in a preferred embodiment of the formulation of the additive, is less than one fifth of the volume, 16.64%, is amplified many times by detonation over the AED that would be released if the EHN were combusted. According to the law of conservation of energy, the total energy of an isolated system cannot change. Therefore, the apparent energy increase in the detonation of EHN occurs by a reduction in the heat energy produced in the combustion of hydrocarbon in the cylinder producing a reduction in the quantity of heat released as exhaust from the ICE. This reduction in the exhaust's heat results in a lowering of the exhaust temperature and an associated increase in the Carnot efficiency. The Carnot efficiency is a function of the difference in the temperature of combustion and the temperature of the discharge gases measure in units of absolute temperature.

The formulation shown in FIG. 2 is the triggering component Sunoco Max NOS (SMN), a lead containing fuel and VP Tech's MS 109 (VMS), an unleaded fuel. Both fuels contain the requisite corrosion inhibitor (e.g., DCI-11 plus) and detergent (e.g., DMA-641) additives to protect the ICE. The additional component in the unleaded additive containing VMS fuel in FIG. 2 is organoplatinum. The detonation of the released EHN is triggered by the SMN and VMS fuels just as a hydrogen bomb is triggered by a low nuclear yield atomic bomb. As the piston continues to increase the pressure in the cylinder the SMN or VMS present combines with the chemical remnants of combustion to act like a primary explosive cap and cause detonation of the EHN to occur.

The SMN contains lead and VMS fuel contains organopalladium or organoplatinum that each acts as a catalyst to reduce the energy threshold required for the hydrolysis of the olefins to occur and for the detonation of the EHN to occur. The allowable limit of lead in gasoline is 50 mg. In Test One and Test Two, the dosage of additive was 1.5 fluid ounces in 20 gallons of gasoline. In Test Three, the dosage of Additive used was 0.64 fluid ounces in 20 gallons of gasoline. In Test Four, VMS fuel blended organoplatinum, at a dose of 0.04 mg/gallon as platinum, the dosage of additive used was 0.64 fluid ounces in 20 gallons of gasoline.

FIG. 3 contains the conversion of additive in fluid ounces into relative dilution and the associated lead concentration in the gasoline. The SMN contains 0.375 percent by volume of lead per gallon as tetraethyl lead. The actual lead content in the gasoline after blending with the additive is far below the allowable limit of 50 ppm because the lead content of SMN is diluted first by the other components in the additive 10:1 and then by the gallons of blended gasoline. Thus, the concentration of additive blended with gasoline in Test One and Test Two is 1:1,707 and in the concentration of additive blended with gasoline in Test Three is 1:4,000. The concentration of lead, as shown in FIG. 3 in Test One and Test Two for an additive dose of 0.64 fluid ounces per 20 gallons of gasoline, is 0.08 mg/gallon as lead, and in Test Three for an additive dose of 1.5 fluid ounces per gallons of gasoline is 0.19 mg/gallon as lead. The additive's lead dose in Tests One and Two is only 0.16% of the allowable maximum lead concentration in gasoline. The additive's lead dose in Test Three and is only 0.38% of the allowable maximum lead concentration. However, these trace quantities of lead are sufficient to impart the requisite catalytic action to the hydrolysis reaction, shown in FIG. 1, to produce two (2) moles of butane with a combined heat of combustion of 91,504 kJ for each mole of octene with a heat of combustion of 44,427 kJ/mole. This reaction results in double the heat of combustion resulting in an increase in the net energy available for the ICE compared to the heat of combustion of the olefin before hydrolysis occurs.

The Improved Efficiency Triangle

FIG. 4 presents the factors, that when taken together, combine to increase the efficiency of an ICE. The preparation of this figure was inspired by the fire triangle that shows the three elements, fuel, heat and oxygen, that each must be present in sufficient quantity for a fire to occur. In the present invention, the three elements, olefins, octane number, and compression ratio must be present in sufficient quantities for the hydrolysis reaction to occur that produces an increase in butane concentration as the olefin concentration is reduced in the cylinder resident reaction.

The double bonds between carbons in the olefins, present in gasoline, are heat and pressure sensitive. Reformulation of gasoline, performed in refineries, often involves high temperatures and pressures causing double bonds present in olefins (alkenes), to transform into single bonds present in alkanes. The extent of the reduction in olefins during gasoline reformation, is measured by the decrease in bromine number making this portion of the olefins unavailable for the hydrolysis reaction to occur. All gasolines, have a starting point, consisting of hydrocarbons derived from distillation of crude oil called "straight run" gasoline. The hydrocarbons in "straight run" gasoline distillation fraction has a boiling point range of 104 degrees F. (40 degrees C.) to 401 degrees F. (205 degrees C.). The commercially available gasoline that is 100% "straight run" contains a "yellow" dye signifying that it has not been taxed and is for off-road uses such as on farms. This gasoline contains eighty One percent (81%) by weight Olefins, that is the highest concentration in any commercially available gasoline. Therefore, "yellow" gasoline has the potential for producing the highest quantity of butane by the hydrolysis of the olefins. The second highest concentration of olefins in commercially available gasoline is in regular grade gasoline. The concentration of olefins in gasoline can be determined by dividing the bromine number by the number 2.4. the bromine number decreases as the grade of gasoline, and the price at the pump increase from regular, to mid-grade and the premium.

The cylinder pressure in the ICE is the sum of the engine's compression ratio, the contributions to RVP from the quantity of the butane in the gasoline and the quantity of butane produced by the cylinder resident hydrolysis reaction. The threshold pressure for the reaction to occur is ten (10) atmospheres. This pressure is achieved in an ICE with a compression ratio of 10. Engine's with higher compression ratios add additional pressure. The RVP of butane is 52 psi. Therefore, if the fuel had a 100% butane content, which it does not and cannot have, this would add 3.5 atmospheres: equal to a compression ratio of 13.5. For each 10% of the olefins hydrolyzed to butane there is an increase in the butane of almost 20% that, 2 moles of butane from each mole of olefins, results in an increase in the pressure of 0.7 atmospheres $\{(52/14.7)\times(20/100)\}$ producing and apparent compression ratio increase of 0.7 to 10.7.

The starting octane number (ON) for the hydrolysis reaction to occur is the ON of 55 found for "straight run" gasoline: that is commercially available as "yellow" gasoline. Butane, with an ON of 102, increases the ON in proportion to the percent completion of the cylinder resident reaction that produces butane by the hydrolysis of olefins. If the hydrolysis reaction is sufficiently complete to produces 60% butane, then the ON of the gasoline in the cylinder is 94 (0.4×55+0.6×102). The gasoline produced at this percent completion of the "straight run" gasoline is superior to a premium grade gasoline's ON of 91 and has an ON 3 units higher than the average premium grade gasoline that is commercially available in the US.

Comparison of Conventional Reformulated Gasoline and Present Invention Gasoline

FIG. 5 is a comparison of the chemical additions that increase the ON and the RVP in conventional gasoline blending to the present invention's cylinder resident chemical hydrolysis that accomplish the requisite increase in ON and the RVP as well as an increase in the gasoline's heat of combustion to produce a premium fuel from lower grades commercially available gasolines that contain olefins. The present invention's ability to eliminate the negative of "vapor locking" by harnessing the pressure and temperature conditions to in situ produce butane allows the completion of the gasoline formulation with concentrations of butane not limited to 2% in summer gasoline and 10% in winter gasoline. The cylinder resident reaction produced butane, with ON of 102, eliminates or reduces the need to add naphthene, used in the production of conventional gasoline, at the refinery to increase the ON of the fuel in the production of "reformulated gasoline". The cylinder resident reaction produced butane, with RVP of 52 psi, eliminates the need to add butane to the gasoline at the refinery, to aid the "cold start" of the engine, by increasing the RVP of the fuel in the reformatting process used for production of conventional gasoline.

Test One—Racing Fuel

FIG. 6 shows the result and calculations for a racing fuel treated with 1.5 fluid ounces of the leaded additive formulation in FIG. 2, in twenty (20) gallons of fuel. In this test, regular grade gasoline with ON of 88 was blended with the additive at a volume ratio of 1,707 parts of gasoline to 1 parts of additive (20 gallons to 1.5 fluid ounces). The blending of regular gasoline and the additive produced a racing fuel with an ON of 121. This is a ON that is 5 units higher than the existing racing fuel that cost $6.11 a gallon: when purchased at the pump at a racing track in the St. Louis area of Missouri. Based on calculations, the additive's theoretical values ON is 55,088 with a value of $6,602 a gallon. In practice, the blending of the additive with regular gasoline, at a cost of $2.15 a gallon, produces a racing fuel with an ON that is 5 units higher than existing racing fuel. Therefore, the additive increases the value of the regular gasoline by $3.96 a gallon or the 0.075 fluid ounces of additive, used to treat a single gallon of regular gasoline, is calculated to be worth $6,785: almost the same value as first calculated above. How can 0.075 fluid ounce of additive in a gallon of gasoline have such a profound effect on increasing the ON of the fuel unless it was radioactive material? But the additive is not radioactive. Therefore, the only possible explanation is that the additive initiates a reaction in the bulk of the fuel to produce these profound results and that change results from the hydrolysis of hydrocarbon with longer chain length of carbons to hydrocarbons with shorter chain length of carbons that have a greater energy density per mole.

Test Two—Advancing of Spark Ignition

FIG. 7 shows the relationship between the ICE's efficiency and the ignition timing advance as an integrating parameter of ON, and compression ratio. Results from testing existing racing fuel, with and ON of 116, shows optimum performance at 4 degrees ignition timing and for testing racing fuel treated with 1.5 fluid ounces of leaded additive in twenty (20) gallons of fuel, with an ON of 121, shows optimum performance at 9 degrees ignition timing: a more than doubling the advance in ignition timing. Based on FIG. 7, this advance in ignition timing corresponds to an increase in energy efficiency of six percent (6%).

The increase in the engine's efficiency with increased ignition advance is due to increased pressure in the compression stroke that results in the production of more network by the ICE. If ignition is too advanced, too much of the gas will burn while the piston is rising, resulting in a decrease in the ICE's ability to expend the work that must be done to compress the gas. These competing effects create a point at which optimum performance is achieved. The results in the occurrence of a point of maximization of engine's efficiency at an ignition advance that is specific to the racing fuel treated with 1.5 fluid ounces of additive in twenty (20) gallons of fuel.

Test Three—Low Compression Engine

Fueling, a low compression engine, with regular gasoline, treated 0.64 fluid ounce of leaded additive, to 20 gallons of resulted in no discernable increase in miles per gallon. However, it was reported that there was an improvement in the engine's "cold start". This test provides antidotal evidence that, even under low compression cylinder condition, a cylinder resident hydrolysis reaction occurs. This reaction resulted in the production of butane (C4) hydrocarbon that raises the Reed Vapor Pressure (RVP) so that the engine's "cold start" performance was improved. Because butane (C4) hydrocarbons have an enormously large RVP of 55, even a small increase in concentration of butane (C4) hydrocarbons in the cylinder's fuel can have a large effect on improving the engine's "cold start" performance.

Test Four—Comparison of Leaded and Un-Leaded Additive

Fueling, a high compression engine, with regular gasoline, treated 0.64 fluid ounce of leaded additive in one test and unleaded additive in another test resulted in increased mileage and power and increase in miles per gallon. Both the leaded and the unleaded formulation, shown in FIG. 2 performed practically the same.

FIG. 8 shows three examples of how the additive can save consumers money. In this figure the additive, with the formulations shown in FIG. 2, is branded as the commercial name (Detonator™) and for market reasons the same formulation is sub-branded as Detonator™, Detonator Racing™ and Detonator Alcohol™. The additive, in the present invention, can be added to regular grade gasoline to produce premium grade gasoline to save a consumer, that had used premium grade gasoline, $6.90 on the purchase of 20 gallon of fuel. The additive, in the present invention, can be added to regular grade gasoline to produce racing grade gasoline to save a consumer, that had used premium racing grade gasoline, $85.85 on the purchase of 20 gallons of fuel. The additive, in the present invention, can be added to E85 gasoline to raise energy of 20 gallons of E85 to be equivalent to 30 gallons of E85 to save the consumer $11.15 on the purchase of fuel.

Observation

The production of gasoline in accordance with the present invention can be thought of as a combination of: 1) rolling back time to when the function of the refining was only distillation of crude to produce "straight run" gasoline rich in the olefin component; and 2) harnessing today's high compression engine's cylinder to upgrade low octane "straight run" gasoline to high octane premium grade by converting a portion of the olefins present to petroleum gas.

Although the invention has been explained in relation to its preferred embodiment, it is to be understood that many other possible modifications and variations can be made without departing from the spirit and scope of the invention as hereinafter claimed.

What is claimed is:

1. A method to increase an Internal Combustion Engine's (ICE's) efficiency of utilization of the energy resident in a fuel to mechanical energy comprising: manufacturing an additive; blending the additive with a gasoline fuel that contains octene; fueling the additive and the gasoline fuel to a spark ignited ICE with a high compression ratio of at least 10:1; initiating a cylinder octene hydrolysis reaction to form butane prior to combustion of the octene, in which one mole of octene hydrolyzes into two moles of butane to increase the combustion heat value of the fuel; and combusting the butane and the fuel, wherein the additive comprises two organic nitrogen-containing compounds, which are 2-ethylhexyl nitrate and nitro methane; a polar solvent blend consisting of methanol, acetone and an unleaded or leaded racing fuel; a metal catalyst; a corrosive inhibitor; and a detergent.

2. The method according to claim 1, wherein the ICE's spark ignition is a computerized ignition system that advances the spark to an efficient increase zone to greater than 5 degrees and less than 30 degrees, and reduces an air to fuel ratio below the stoichiometric combustion ratio to reduce the energy lost to heating of air, without the occurrence of unwanted knocking, autoignition during the compression cycle.

3. The method according to claim 1, wherein the gasoline fuel comprises other olefins in addition to octene.

4. The method according to claim 1, wherein one mole of octene produces 44,427 kJ of heat of combustion, and two moles of butane produce 91,504 kJ of heat of combustion.

5. The method according to claim 1, wherein the two organic nitrogen-containing compounds are 2-ethylhexyl nitrate and nitro methane that are blended to achieve a concentration range of 42-98 ppm and 53-163 ppm, respectively.

6. The method according to claim 1, wherein the polar solvent blend consists of methanol, acetone and an unleaded or a leaded racing fuel that are blended to achieve concentration ranges of 102-238 ppm, 26-60 ppm and 26-62 ppm, respectively.

7. The method according to claim 1, wherein the metal catalyst is an organopalladium or organoplatinum.

8. The method according to claim 1, wherein the corrosion inhibitor is in the concentration of 0.7-1.7 ppm in the gasoline; and the detergent is in the concentration of 1.4-3.3 ppm in the gasoline.

9. The method according to claim 1, wherein the two organic nitrogen-containing compounds are 2-ethyhexyl nitrate and nitro methane that are blended to achieve a concentration range of 42-98 ppm and 53-163 ppm, respectively; the polar solvent blend consists of methanol, acetone and an unleaded or leaded racing fuel that are blended to achieve a concentration ranges of 102-238 ppm, 26-60 ppm and 26-62 ppm, respectively; the metal catalyst is organopalladium that is present in the gasoline in a concentration range of 0.1-0.4 ppm; the corrosion inhibitor is in the concentration of 0.7-1.7 ppm in the gasoline; and the detergent is in the concentration of 1.4-3.3 ppm in the gasoline.

10. The method according to claim 1, wherein the gasoline fuel is regular grade gasoline or E-85, a blend of 85% Ethanol and 15% gasoline.

11. The method according to claim 1, wherein an amount of 1.5 or 0.64 fluid ounces of the additive is added to 20 gallons of the gasoline fuel.

12. The method according to claim 1, wherein the additive is leaded or unleaded.

13. The method according to claim 12, wherein the additive is unleaded and the metal catalyst is an organopalladium or organoplatinum.

* * * * *